United States Patent
Iles-Klumpner

(10) Patent No.: US 6,919,663 B2
(45) Date of Patent: Jul. 19, 2005

(54) INTERNAL ROTOR MOTOR

(75) Inventor: Dorin Iles-Klumpner, St. Georgen (DE)

(73) Assignee: ebm-papst St. Georgen GmbH & Co. KG, St. Georgen (DE)

(*) Notice: Subject to any disclaimer, the term of this patent is extended or adjusted under 35 U.S.C. 154(b) by 93 days.

(21) Appl. No.: 10/390,824

(22) Filed: Mar. 18, 2003

(65) Prior Publication Data

US 2003/0218399 A1 Nov. 27, 2003

(30) Foreign Application Priority Data

Mar. 22, 2002 (DE) .................................. 202 04 660 U

(51) Int. Cl.⁷ .................... H02K 21/12; H02K 21/26
(52) U.S. Cl. ...................... 310/156.53; 310/156.01; 310/156.32; 310/156.38; 310/156.48; 310/156.56; 310/269
(58) Field of Search ...................... 310/156.53, 156.56, 310/156.33, 216–218, 156.63, 269, 156.66, 261, 263, 156.01, 156.38, 156.32, 156.48; 29/596–598

(56) References Cited

U.S. PATENT DOCUMENTS

| 4,445,061 A | 4/1984 | Jackson ..................... 310/156 |
| 4,570,333 A | 2/1986 | Jones ......................... 29/598 |

(Continued)

FOREIGN PATENT DOCUMENTS

| DE | 198 51 883 A1 | 5/2000 |
| DE | 100 20 946 A1 | 11/2001 |
| EP | 0 343 457 | 11/1989 |
| EP | 1 067 656 | 1/2001 |
| EP | 1 164 684 | 12/2001 |
| GB | 1 314 901 | 4/1973 |
| JP | 07-222 384 | 8/1995 |
| JP | 08-251 846 | 9/1996 |
| JP | 10-271-723 A | 10/1998 |
| JP | 2000-217 287 A | 8/2000 |
| JP | 2001-069 701 A | 3/2001 |

OTHER PUBLICATIONS

Magneticasoft, "MAGNETICA—Magnetostatics for personal computers," ©2000, pp. 1–2, found at www.magneticsoft.com/features.

Infineon Technologies, Munich Germany, "Product Brief GMR–B6 & GMR–C6 Giant Magneto Resistor –the optimized angle sensor," copyright 2001, Ordering No. B112–H7829–X–X–7600, pp. 1–2; further details available at WWW.INFINEON.COM.

*Primary Examiner*—Tran Nguyen
*Assistant Examiner*—Leda Pham
(74) *Attorney, Agent, or Firm*—Milton Oliver, Esq.; Ware Fressola Van Der Sluys & Adolphson LLP

(57) ABSTRACT

A low-ripple multi-phase internal rotor motor has a slotted stator (28) separated by an air gap (39) from a central rotor (36). The rotor has a plurality of permanent magnets (214), preferably neodymium-boron, arranged in pockets (204) formed in a lamination stack (37), thereby defining a plurality of poles (206) separated by respective gaps (210). In a preferred embodiment, the motor is three-phase, with four rotor poles and six stator poles. As a result, when the first and third rotor poles are so aligned, with respect to their opposing stator poles, as to generate a reluctance torque, the second and fourth rotor poles are aligned to generate oppositely phased reluctance torques, so that these torques cancel each other, and essentially no net reluctance torque is exerted on the rotor. In order to magnetically separate the rotor magnets from each other, a hollow space (224, 238) is formed at the interpolar-gap-adjacent end face (216, 218) of each rotor magnet. A control circuit (147) provides electronic commutation and current control, based on rotor position signals generated with the aid of a control magnet (110) on the rotor shaft (40).

22 Claims, 12 Drawing Sheets

U.S. PATENT DOCUMENTS

| | | | |
|---|---|---|---|
| 4,700,098 A | 10/1987 | Kawashima | 310/186 |
| 5,078,590 A | 1/1992 | Högseth | 425/589 |
| 5,097,166 A | 3/1992 | Mikulic | 310/156 |
| RE34,412 E * | 10/1993 | Elsaesser et al. | 360/99.08 |
| 5,331,245 A | 7/1994 | Burgbacher et al. | 310/186 |
| 5,581,140 A * | 12/1996 | Futami et al. | 310/156.53 |
| 5,679,995 A | 10/1997 | Nagate et al. | 310/156 |
| 5,684,352 A | 11/1997 | Mita et al. | 310/156 |
| 5,841,212 A | 11/1998 | Mita et al. | 310/156 |
| 5,864,191 A * | 1/1999 | Nagate et al. | 310/156.54 |
| 5,973,431 A * | 10/1999 | Li et al. | 310/168 |
| 6,181,047 B1 | 1/2001 | Nitta | 310/254 |
| 6,208,054 B1 * | 3/2001 | Tajima et al. | 310/46 |
| 6,208,055 B1 | 3/2001 | Takahashi | 310/156 |
| 6,234,767 B1 | 5/2001 | Takeda et al. | 417/355 |
| 6,265,804 B1 | 7/2001 | Nitta et al. | 310/259 |
| 6,484,581 B2 * | 11/2002 | Nishimoto et al. | 73/579 |
| 6,582,207 B2 * | 6/2003 | Matsumoto et al. | 417/410.1 |
| 2002/0067096 A1 | 6/2002 | Yamamoto et al. | 310/216 |

* cited by examiner

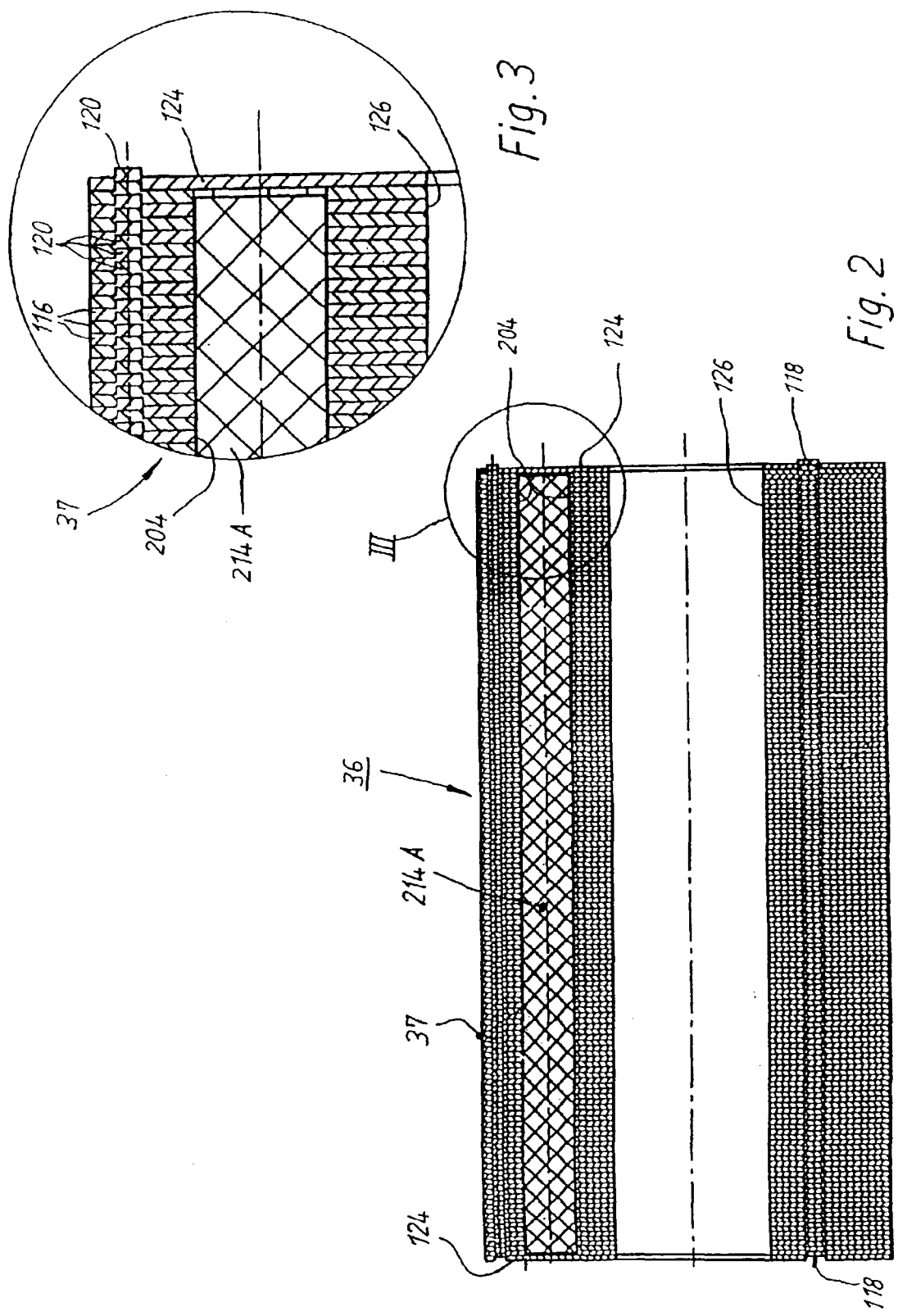

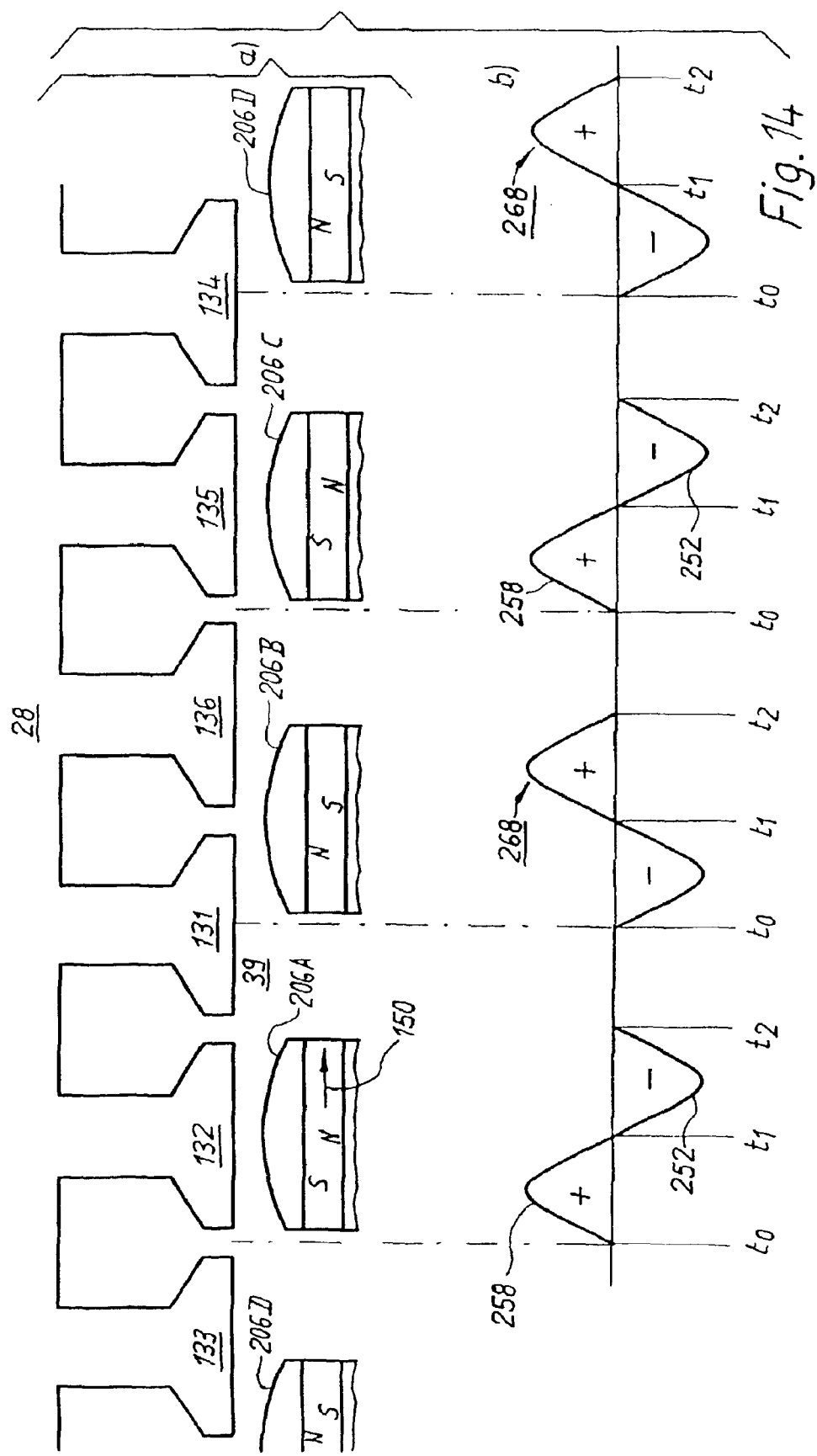

* cited by examiner

US 6,919,663 B2

INTERNAL ROTOR MOTOR

FIELD OF THE INVENTION

The present invention relates generally to a multiphase internal rotor motor with a slotted stator and a permanent magnet rotor.

BACKGROUND

In such motors, the phenomenon occurs that the boundaries between the individual rotor poles, the so-called "pole boundaries," seek the positions of the largest air gaps. For the observer, this has the appearance that the pole boundaries are attracted by the slots of the stator. This effect is called "cogging." The torque created thereby is called "cogging torque" because it seeks to hold the rotor in particular rotational positions, or arrest it as it passes through those positions.

This effect is generated by a so-called "reluctance torque," i.e. during the rotation of the rotor, relative to the stator, in the magnetic circuit of the motor, in certain rotation angle ranges, magnetic energy is stored, and, in other rotation angle ranges, this magnetic energy is released, analogous to when one alternately tensions a spring and releases it. For the storing, energy must be supplied to the rotor, i.e. the rotor is being braked, and conversely, where the stored energy is being released, the rotor is being driven. If one turns the rotor of such a motor by hand, one has the impression that one "feels every slot."

In the context of many drive applications, this reluctance torque is disruptive, so that there one is forced to use so-called "ironless" stator windings, in which no reluctance torque arises. However, the power of such motors with ironless stators is generally insufficient because their air gap is very large.

SUMMARY OF THE INVENTION

It is therefore an object of the invention to provide a sufficiently powerful internal rotor motor with minimized cogging torque. According to the invention, this object is achieved by shaping the magnetic circuit of the rotor in such a way that respective reluctance torques generated in operation tend to cancel out. Specifically, the rotor is formed with a plurality of magnetically nonconducting regions (MNR) at predetermined locations. One thereby obtains an internal rotor motor with improved characteristics, in which the cogging torque can be kept very small.

Further details and advantageous refinements of the invention are set forth in the following description and accompanying drawings, which are to be understood as preferred embodiments but not as any limitation of the invention.

BRIEF FIGURE DESCRIPTION

FIG. 2 is an enlarged longitudinal section through the rotor lamination stack of the motor of FIG. 1, seen along section line VI—VI of FIG. 5;

FIG. 3 is a further enlarged longitudinal section of a detail which, in FIG. 2, is designated III;

FIGS. 14 are a sketch and graph to explain how the cogging torques of different rotor poles superimpose;

DETAILED DESCRIPTION

Figure 1:
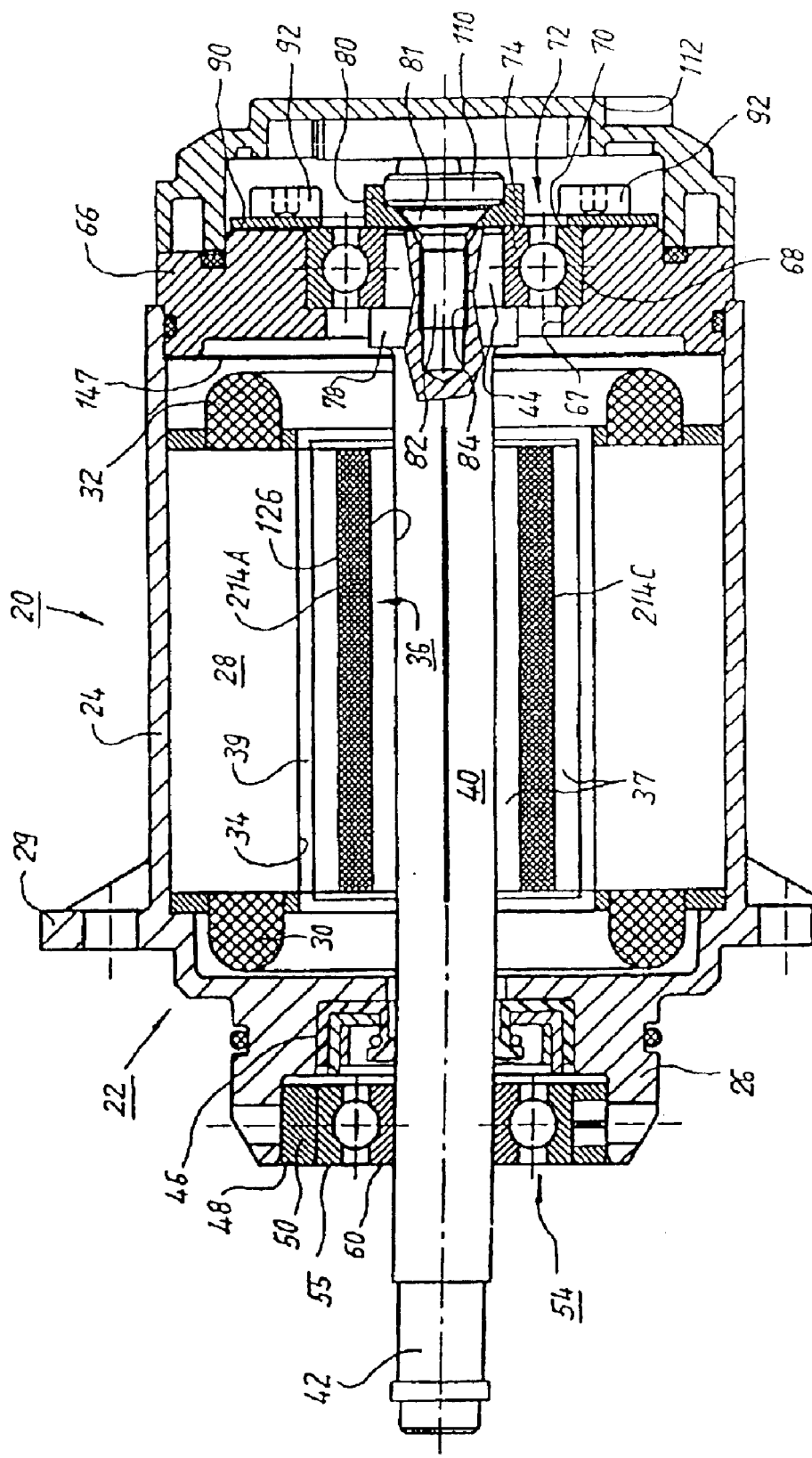
FIG. 1 is a longitudinal sectional view of a preferred embodiment of an electronically commutated internal rotor motor according to the present invention.

FIG. 1 shows an electronically commutated internal rotor motor 20 with a housing 22 having a cylindrical housing portion 24, an A-side bell 26 and a securing flange 29.

Figure 9:
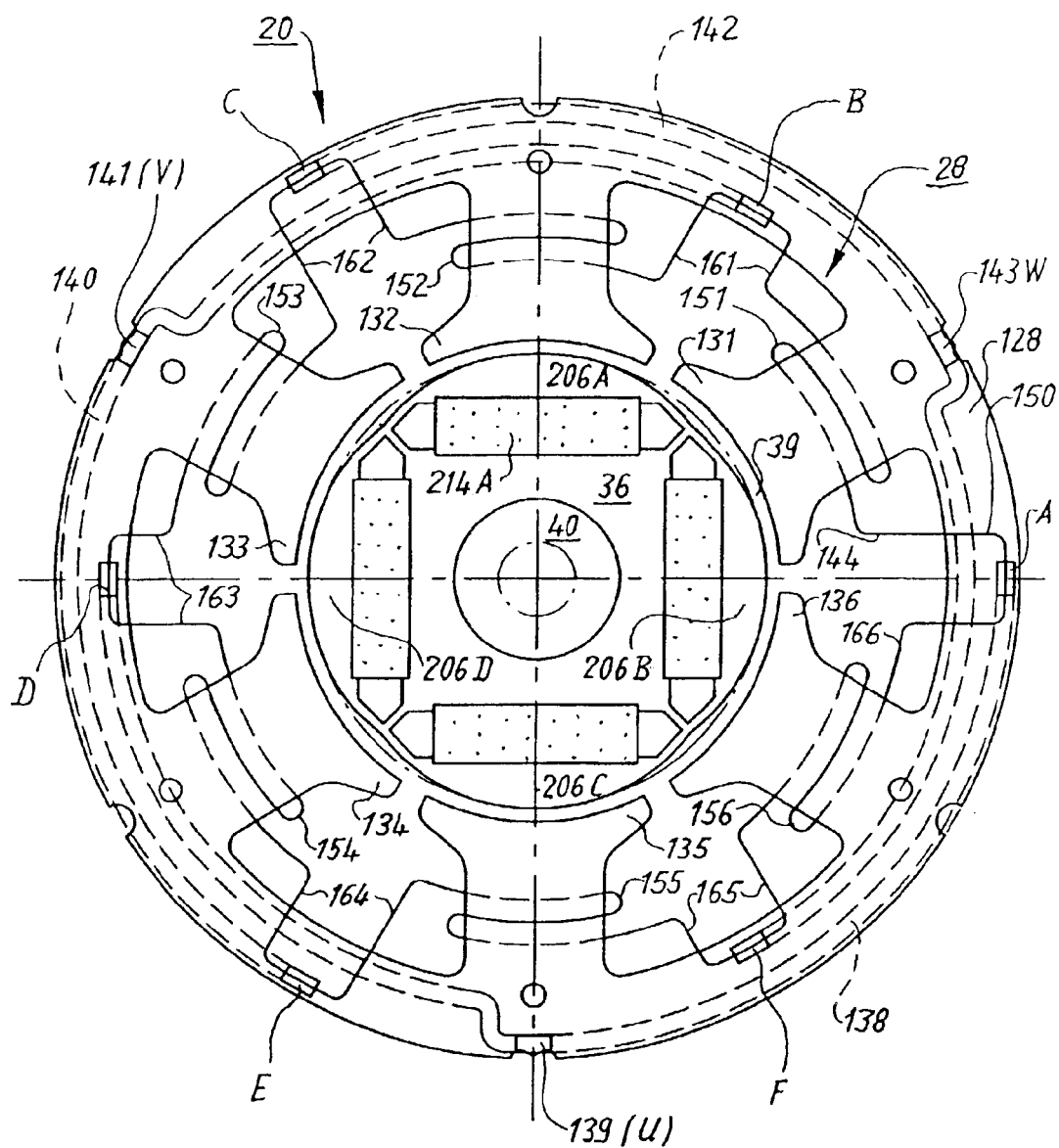
FIG. 9 is a view, in part schematic, of the stator and rotor of FIG. 1, seen in a conventional sectional view.
Figure 10:
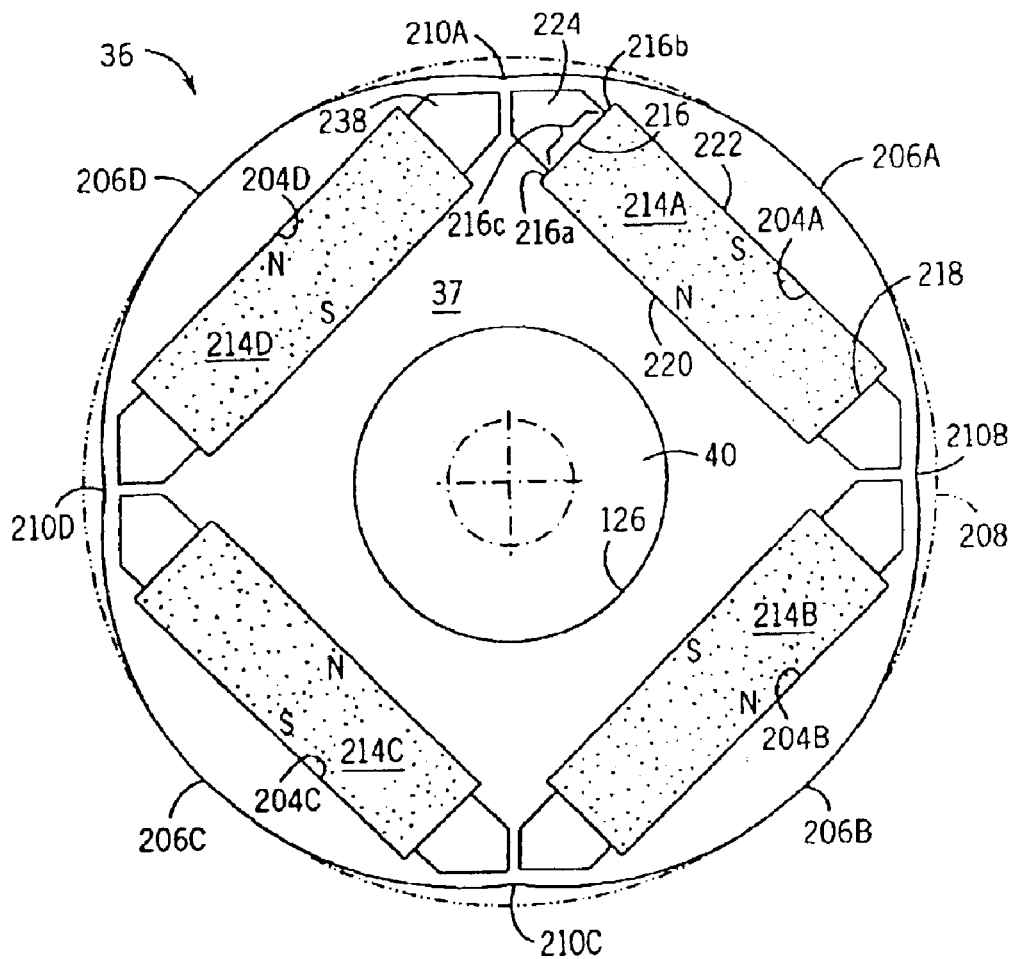
FIG. 10 is an enlarged view of the rotor, in a sectional view.
Figure 11:
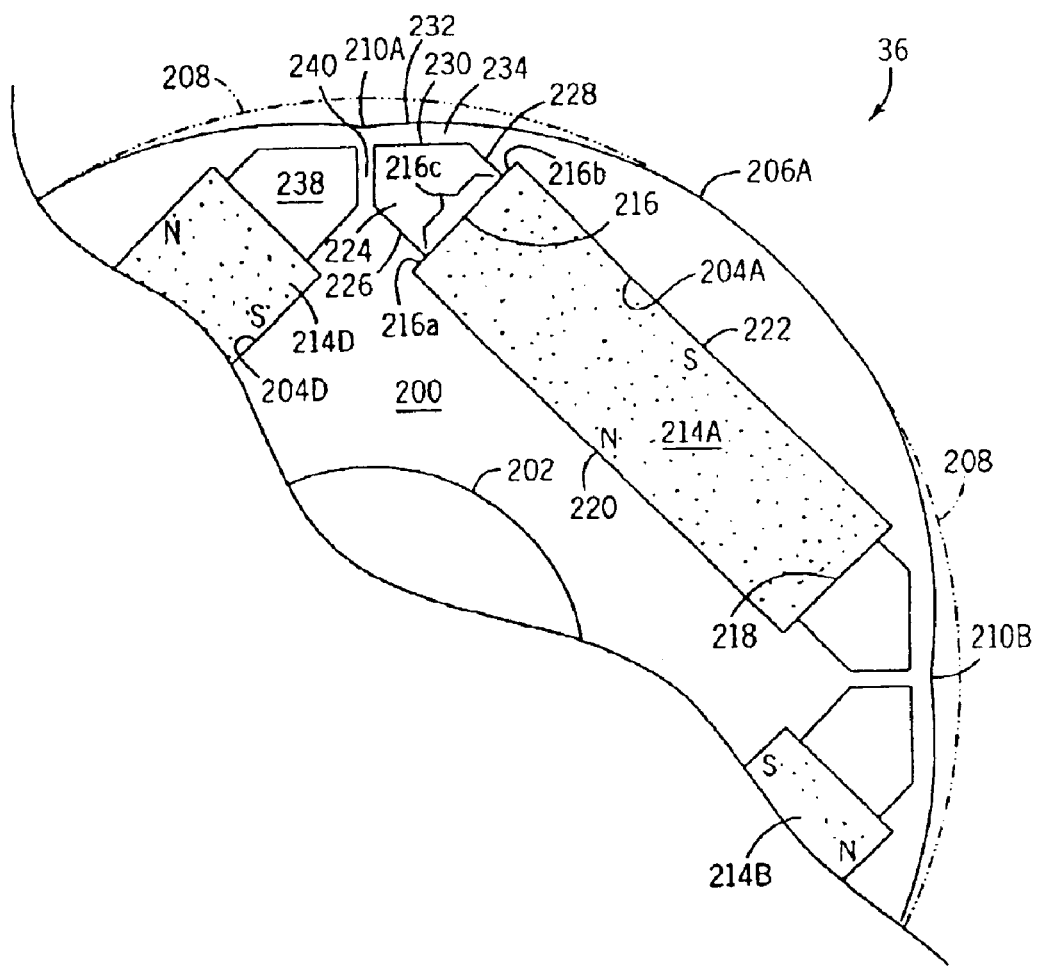
FIG. 11 is a further enlarged detail of the FIG. 10 rotor.

In the cylindrical housing portion 24, there is arranged the lamination stack 128 (FIG. 9) of an external stator 28 whose winding heads are designated 30 and 32. Stator 28 has an internal recess 34, in which the rotor is received. The rotor is a four-pole internal rotor 36 with a lamination stack 37 of electrical steel, preferably alloy V400, and permanent magnets 214A through 214D (Cf. FIGS. 9–11). Rotor 36 is arranged on a shaft 40, whose drive end is designated 42 and whose inner end is designated 44. An air gap 39 separates stator 28 from rotor 36. Such a motor can be called a "permanently excited synchronous internal rotor machine."

In the A-side bell 26, in the usual manner, a seal 46 is provided for the shaft 40. Also there is a recess 48, into which is placed a guide element 50 for the outer race 55 of a ball bearing 54. The inner race 60 of ball bearing 54 is pressed onto shaft 40. In the open end of cylindrical housing portion 24, a B-side bell 66 is secured. It has a recess 68 provided with an annular shoulder 67 for the outer race 70 of a ball bearing 72, whose inner race 74 is secured to shaft end 44. Shaft 40 has a collar 78, with which it rests against the left side of inner race 74.

Against the right side of inner race 74 rests a fitting 80 which is pressed by the countersunk head 81 of a countersunk screw 82 in the direction of shaft 40, and which has an essentially annular shape. Screw 82 engages in an internal thread 84 in shaft end 44, and thereby presses the fitting 80 in the direction of inner race 74.

For secure holding-in of outer race 70, there is provided a flat, annular part or washer 90, which is secured at its outer periphery to bell 66 using three evenly spaced screws 92. Part 90 rests, with its radial inner portion against outer race 70, which it presses leftwards against shoulder 67. The recess 68 is somewhat shallower than the outer race 70.

The screw 82 is a flathead screw with a hexagonal recess. Fitting 80 is made of a non-ferromagnetic material, preferably brass.

After fitting 80 is secured, by means of screw 82, onto shaft end 44, a control magnet 110 is secured in a cylindrical recess of fitting 80, e.g. by gluing. Control magnet 110 is provided, on its right side as shown in FIG. 1, with a magnetization pattern, and serves for control of magnetoresistive sensors (not shown) which are arranged inside a housing cover 112 on the B-side of motor 20, and serve for detection of the rotational position of rotor 36, in order to exactly control the form and commutation of the currents in stator 28. A preferred sensor model is the GMR-C6, in which the signal depends on the direction of the magnetic field and not on the strength thereof. Commutation by means of such rotor position sensors controlled by a control magnet 110 is known, in many variations, to those of ordinary skill in the art, and therefore requires no further explanation. The magnetization pattern on the right side of control magnet 110 is preferably first created after the magnet is secured in fitting 80, and this preferably occurs when the permanent magnets of rotor 36 are magnetized.

Figure 5:
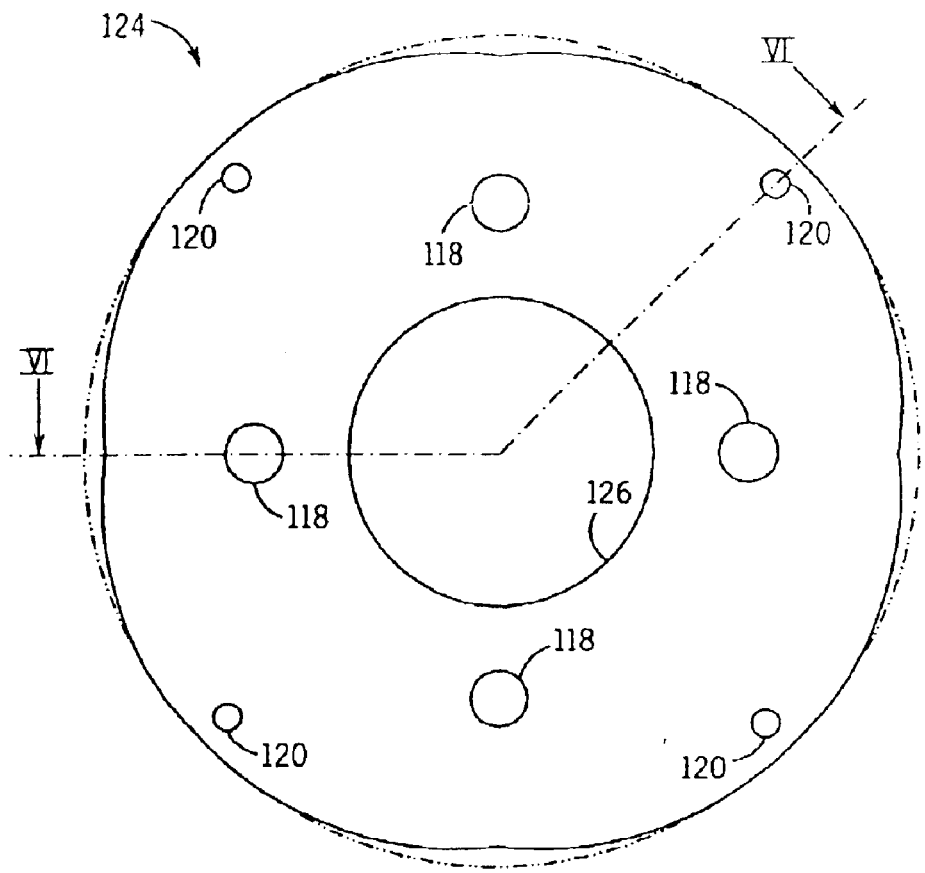
FIG. 5 is an enlarged plan view of an end disk of the rotor stack.

FIG. 2 is a section through the lamination stack 37 of rotor 36, looking along line VI—VI of FIG. 5. Lamination stack 36 is assembled from metal laminations 116, as shown greatly enlarged in FIG. 3.

Figure 4:
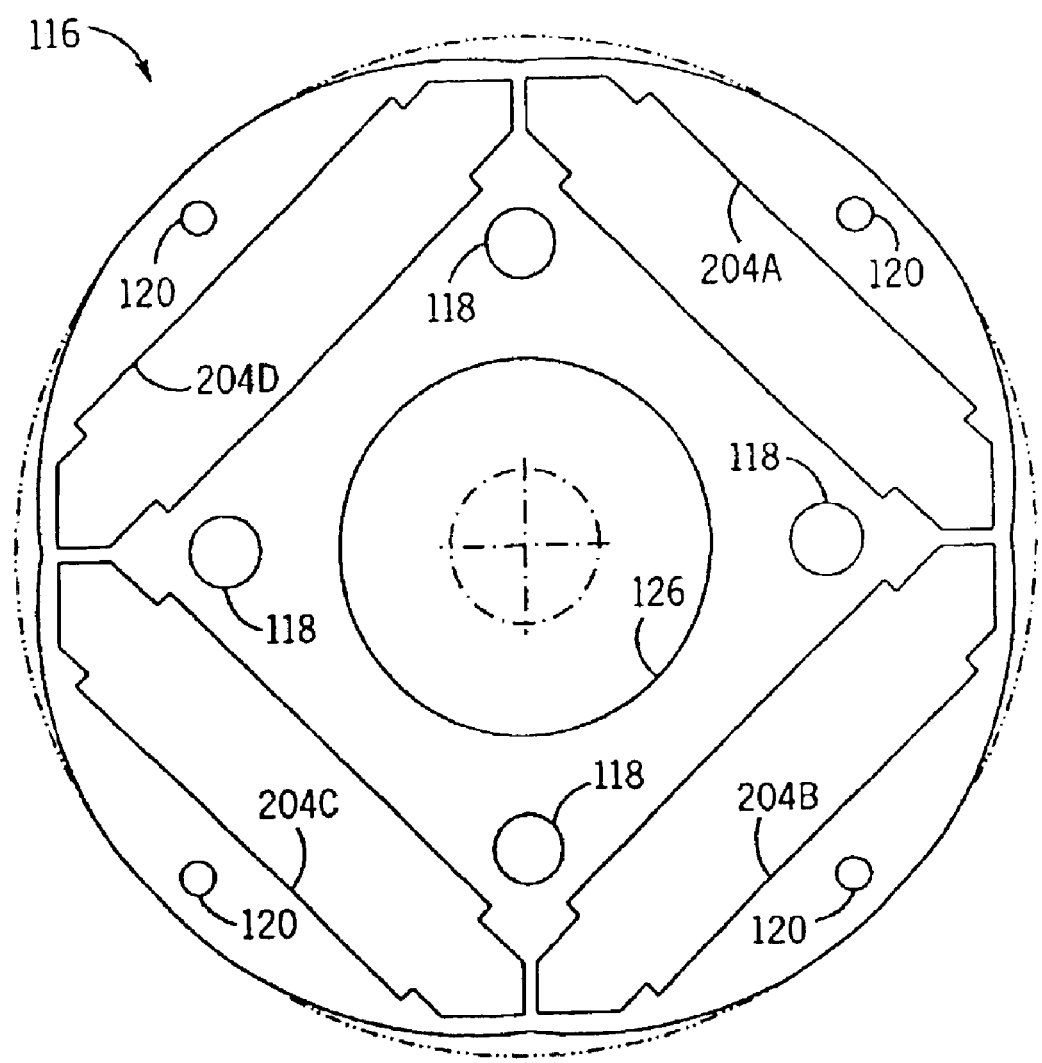
FIG. 4 is an enlarged plan view of a lamination of the rotor stack.

FIG. 4 is a plan view of such a lamination 116, e.g. of dynamo sheet iron V400, as described below in greater detail with reference to FIGS. 9–11. The lamination is provided with altogether eight bosses for a so-called "punch packetization," namely with four inner bosses 118, shown in the enlarged view of FIG. 7, and with four outer bosses 120, shown in the enlarged view of FIG. 8. FIG. 3 shows how the outer bosses 120 engage in each other and thereby hold the lamination stack 37 together. This representation is equally valid for the bosses 118, so that two adjacent sheets 116 are connected at a total of eight places by means of these boss engagements.

In the lamination stack are four neodymium-boron permanent magnets 214A through 214D in respective pockets 204A through 204D; cf. FIGS. 9–11. Preferably, these permanent magnets have a magnetic remanence of 1.2 T (Tesla). Pockets 204A through 204D are closed at both ends by identical endplates 124, of which one is shown in FIGS. 5–8. Such an endplate 124 differs from the rotor lamination sheets 116 in two respects:
a) It has no pockets 204.
b) It is made of a non-magnetic material, usually, for stability reasons, of a non-magnetic stainless steel, e.g. X12 CrNi17.7. This endplate 124 preferably has the same contour or profile as rotor sheets 115 have. It similarly has four inner bosses 118 and four outer bosses 120.

Endplates 124 reliably prevent any fragments of a rotor magnet 214 from escaping from one of the pockets 204 into the interior of motor 20, e.g. into its air gap 39.

Figure 6:
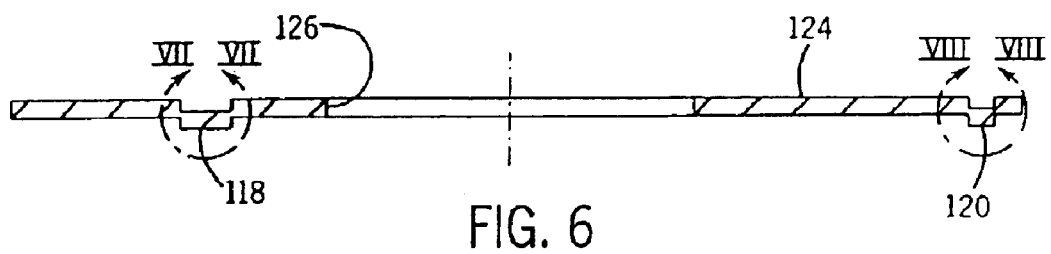
FIG. 6 is a section looking longitudinally along line VI—VI of FIG. 5.
Figure 7:
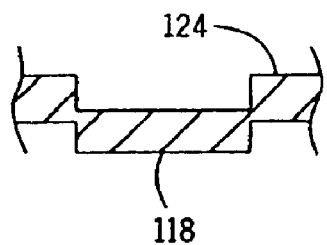
FIG. 7 is a greatly enlarged view of detail VII of FIG. 6.
Figure 8:
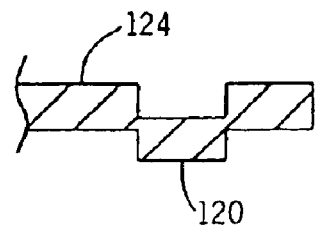
FIG. 8 is a greatly enlarged view of detail VIII of FIG. 6.

FIG. 6 is a section through an endplate 124, from which the form of bosses 118, 120 is roughly recognizable, and FIGS. 7 and 8 show these bosses 118, 120 about five times enlarged. These bosses thus match exactly with those of rotor laminations 116, are assembled with them during the packetization, and are pressed together with them by a predetermined force in a press, in order to obtain specified values (tensile strength; shearing resistance).

Lamination stack 37 has an internal recess 126, into which the shaft 40 is pressed, which shaft thereby becomes a component of the magnetic circuit of the rotor 36.

FIG. 9 is a customary schematic illustration of an external stator 28, and of rotor 36. The stator arrangement 28 has a customary lamination stack 128 in which, within an angular range of 360° mech., six slots with respective slot teeth 131, 132, 133, 134, 135, and 136 are provided, defining between them the corresponding slot openings. On a face side of the stator arrangement are provided, in an insulator (not shown), a U-copper rail 138 with terminal lug 139, a V-copper rail 140 with terminal lug 141, and a W-copper rail 142 with terminal lug 143. These rails each extend over an angle of about 180° mech. but they are rotationally staggered 120° with respect to each other, so that adjacent rails partially overlap. Each rail has a radial jog about halfway along its circumference, so that half the rail has a maximum or "outer" radius from the center of the rotor, while the other half of the rail has a somewhat smaller or "inner" radius, to accommodate the aforementioned overlap of adjacent rails. Since the copper rails 138, 140, 142 each extend over only 180° mech., at each point on the circumference of the stator arrangement, there are at most two copper rails, e.g. at the 12 o'clock position of FIG. 9, rails 142 (outer) and 140 (inner). At the 2:30, 6:30 and 10:30 circumference points, there is only one rail. Each rail extends over about 90° mech. radially outer, and over about 90° mech. radially inner, as shown in FIG. 9.

With reference to an imaginary clock face, the U-rail 138 extends from 3 o'clock to 9 o'clock. The V-rail 140 extends from about 7 o'clock to 1 o'clock. The W-rail 142 extends from about 11 o'clock to about 5 o'clock. These rails are insulated from each other. Their respective terminal lugs 139, 141, 143 serve for electrical connection to a circuit board 147 (FIG. 1) bearing power transistors which control the currents in the stator winding. These are preferably load-independent sinusoidal currents supplied by a power supply in the manner which is customary with such synchronous motors. By using the copper rails, one obtains extremely short and low-inductance power leads, and thereby low losses in these power leads, even at high RPM.

On the teeth or poles 131–136 of lamination stack 128 are identical wound coils, whose (consistent) winding sense is illustratively shown in FIG. 9. On a first tooth 131 is a first wound coil 151. One begins winding this coil, after the beginning end 150 of the winding wire 144 is connected to U-rail 138 at a position A (3 o'clock). Rail 142, at the point of terminal connection A, is completely surrounded by the aforementioned insulator, so that no short circuit between rails 138 and 142 is possible there. This is also true for the other rails, i.e. between the terminal connections, the rails are completely surrounded by the insulator, and at these connection points, only the terminal for one rail protrudes from the insulator. Thereby, a high level of operating safety and reliability results.

After winding coil 151, one winds the second coil 152 on the second tooth 132, then the third coil 153 on the third tooth 133, then the fourth coil 154 on the fourth tooth 134, the fifth coil 155 on the fifth tooth 135, and finally the sixth coil 156 on the sixth tooth 136. Thus, this involves a non-overlapping winding process which facilitates automated manufacturing, particularly since skewing of the stator slots can usually be omitted.

There is created, between coils 151 and 152, a first wire loop 161 which is electrically and mechanically connected to V-rail 140 at a point B (1 o'clock), preferably without interrupting winding wire 144.

There is created, between coils 152 and 153, a second wire loop 162 which is electrically and mechanically connected to W-rail 142 at a point C (11 o'clock).

There is created, between coils 153 and 154, a third wire loop 163 which is electrically and mechanically connected to U-rail 138 at a point D (9 o'clock). Rail 138 thus electrically connects points A and D to each other.

There is created, between coils 154 and 155, a fourth wire loop 164, which is connected to V-rail 140 at a point E (7 o'clock). Rail 140 thus connects points B and E to each other.

There is created, between coils 155 and 156, a fifth wire loop 165, which is connected to W-rail 142 at a point F (5 o'clock). Rail 142 thus connects points C and F to each other.

The free end of coil 156 is designated 166, and is connected at point A to U-rail 138 and the winding beginning 150. Thereby, the winding is terminated.

From the foregoing description, it will be apparent that this is a three-phase winding, without overlapping coils, in which in each phase, two coils are parallel-connected, namely coils 151 and 154 in the phase between terminals U and V, coils 152 and 155 in the phase between terminals V and W, and coils 153 and 156 in the phase between terminals W and U. In the manner usual in three-phase systems, an electronic control circuit (not shown) applies sinusoidal currents to these phases, in order to generate a substantially constant electromagnetic torque. The present invention could be used in other multi-phase systems, but the three-phase system is preferred, due to its relative simplicity.

FIG. 10 is a sectional view of a preferred embodiment of the four-pole rotor 36, at a greatly enlarged scale (about 5-fold enlarged). Its lamination stack 37 contains four identical pockets 204A, 204B, 204C, 204D, which are spaced from each other by an angular interval of 90° mech.=180° el.

The four rotor poles are designated 206A through 206D and configured as salient poles. In order to highlight this, a cylinder 208, surrounding the rotor 36, is indicated by a dash-dotted line. One recognizes that the lamination stack 37 has, adjacent its interpolar gaps 210A through 210D, a slightly smaller diameter, e.g. 97% of the diameter at the center of each pole, the diameter continuously increasing from interpolar gap to pole center. This increase can correspond, for example, to a circular arc segment. Due to this configuration, the flux distribution along the rotor circumference becomes substantially sinusoidal, so that, in operation, one obtains a sinusoidal counter-EMF.

The pocket 204A, shown enlarged as an example in FIG. 11, extends between interpolar gaps 210A and 210B; pocket 204B extends between interpolar gaps 210B and 210C, etc. as shown. In each pocket is located a respective substantially rectangular, radially magnetized permanent magnet 214A through 214D, preferably a neodymium-boron magnet with a magnetic remanence of 1.2 Tesla; in a preferred embodiment of the rotor, it has cross-sectional dimensions 3.5 mm×12 mm and a length of 77 mm. The direction of magnetization alternates; i.e. magnet 214A has a south pole radially outside, the next magnet 21B has a north pole radially outside, etc., as shown.

Pockets 204A, 204B, etc. are, in cross-section, longer than the permanent magnets 214A, 214B, etc. and thus are not completely filled by them. This is explained below using pocket 204A as an example, since the other pockets 204 and permanent magnets 214 have the identical structure.

Magnet 214A has an upper longitudinal end 216 facing interpolar gap 210A and a lower longitudinal end 218 facing interpolar gap 210B. With its wide ends 220 (radially inner) and 222 (radially outer), it abuts, with its full surface, lamination stack 37. By contrast, its upper longitudinal end 216 abuts only against two short shoulders 216a (radially inner) and 216b (radially outer) of lamination stack 37, while a central region 216c of upper longitudinal end 216 borders a hollow space 224 or Magnetically Nonconducting Region (MNR) which, in this example, has the cross-sectional form of an irregular pentagon. Instead of air, such a space could be filled with wood, glass, plastic, or the like to achieve a similar magnetic effect, but the motor starts up quicker if its inertia is low, so leaving the space hollow is preferred over use of other materials. Shoulders 216a, 216b secure the magnet against movement within the pocket. Hollow space 224, and the corresponding seven other hollow spaces, each form a respective magnetic resistance or magnetically nonconducting region (MNR) between adjacent permanent magnets 214 and thus prevent a magnetic short circuit between the four permanent magnets 214A through 214D. Clearly, the relationships at lower end 218 of permanent magnet 214A are identical, and therefore need not be separately described.

Hollow space (MNR) 224 has, as shown in FIG. 11, a radially inner edge 226 which runs essentially parallel to inner pocket edge 220 and connects via shoulder 216a to inner pocket edge 220. Similarly, hollow space 224 has a radially outer edge 228 which runs essentially parallel to outer pocket edge 222 and connects via shoulder 216b to outer pocket edge 222.

Outer edge 228 connects via an obtuse angle to another outer edge 230 which runs essentially parallel to the adjacent periphery 232 of rotor 36, and extends almost to interpolar gap 210A. Between edge 230 and periphery 232, there extends a narrow land 234 having a width of, e.g., 0.5 mm, to about interpolar gap 210A. Between hollow space 224 and the mirror-symmetric hollow space 238 adjacent pocket 204D, there extends a narrow radial bridge 240 which may have a width of, e.g. 0.5 to 1 mm and a length of 1 mm.

In an optimized embodiment, the shoulder 216b had a width of about 0.5 mm and the edge face 228 had a width of about 1 mm. This structure resulted in a total cogging torque whose value was practically zero. The term "cogging torque" is explained below.

As one recognizes, the narrow lands 234, 240 have primarily a mechanical support function. Land 234 operates, due to the high magnetic flux density of about 2 Tesla, in saturation, and thus behaves magnetically like an air gap.

Experience and testing have revealed that the size of shoulder 216b, and its relationship to the length of edge face 228, very strongly influence the magnitude of the cogging torque, so that, by optimization of these dimensions, the cogging torque can be made very small or actually zero. Thereby, one avoids the need to skew the slots of the stator and/or to use an overlapping winding, which would cause higher manufacturing costs. Such a rotor 36 thus has very good characteristics for use as the drive for a power-assisted steering system or the like.

The Problem of Cogging Torque

In electric motors with a permanent magnet rotor, when one uses a stator lamination stack 128 provided with slot openings, one encounters the phenomenon that the boundaries between the individual rotor poles, the so-called "pole boundaries" seek the positions of the largest air gaps. For the observer, this has the appearance that the pole boundaries are attracted by the slots of the stator or "fall into them." This effect is called "cogging." The torque created thereby is called "cogging torque" because it seeks to hold the rotor in particular rotational positions, or arrest it as it passes through those positions.

This effect is generated by a so-called "reluctance torque," i.e. during the rotation of the rotor, relative to the stator, in the magnetic circuit of the motor, in certain rotation angle ranges, magnetic energy is stored, and, in other rotation angle ranges, this magnetic energy is released. For the storing, energy must be supplied to the rotor, i.e. the rotor is being braked, and conversely, where the stored energy is being released, the rotor is being driven using this energy.

If one turns the rotor of such a motor by hand, one has the impression that one "feels every slot."

In the context of many drive applications, this reluctance torque is disruptive, so that there one is forced to use iron-free stator windings, in which, indeed, no reluctance torque arises but, due to the large air gap, the power output is insufficient.

The impression, that the interpolar gaps of rotor 36 cause magnetic effects, is clearly erroneous, since at the interpolar gaps, the magnetic flux is very low. Rather, the magnetic effects are caused at those zones of rotor 36, at which the magnetic flux density B reaches its maximum. For demonstration purposes, it is however useful (even though physically false) to think of the magnetic effects, which cause the cogging torque, as concentrated at the interpolar gap or pole boundary.

This cogging torque is not acceptable in many applications and until now, such motors could only be used there if they had an air gap which was substantially free of such discontinuities.

Figure 12:
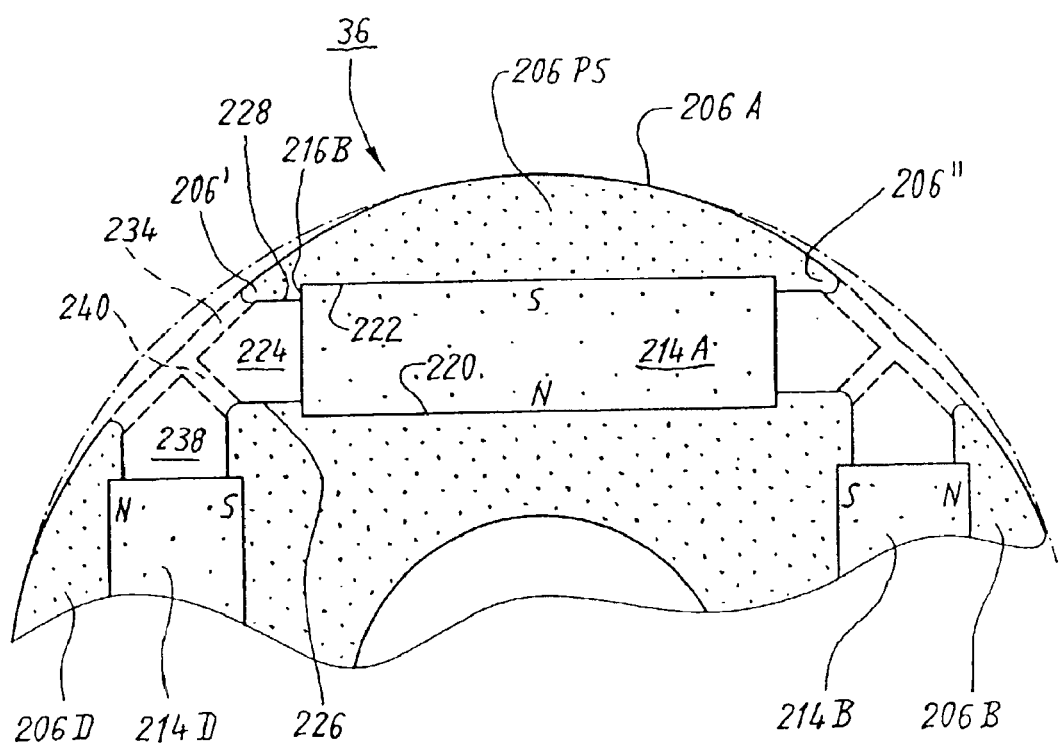
FIG. 12 is a drawing for theoretical explanation of how the invention works.

FIG. 12 illustrates the following attempt at a theoretical explanation of why the empirically tested structure of the present invention has proved successful. This explanation is based on the current state of knowledge, which may later be found to be erroneous in some respect.

Due to magnetic saturation, the narrow lands 234, 240 have essentially no magnetic influence, which is indicated in FIG. 12 by drawing them with dashed lines. However, these elements have an important mechanical support function.

The volumes of iron, bounded outwardly by the air gap 39 and inwardly by shoulder 216b and edge 228, do not reach saturation and thus behave like a sidewise widening 206', 206" of the pole shoe designated 206PS. In order to highlight this graphically and to facilitate understanding, the magnetically effective elements in FIG. 12 are shown stippled.

This widening of the pole shoes occurs in identical form at all rotor poles 206A through 206D and therefore is not described again for the other poles. The hypothesized effect of these widenings on the reluctance torque is explained below with reference to FIGS. 13A & 13B.

Figure 13A:
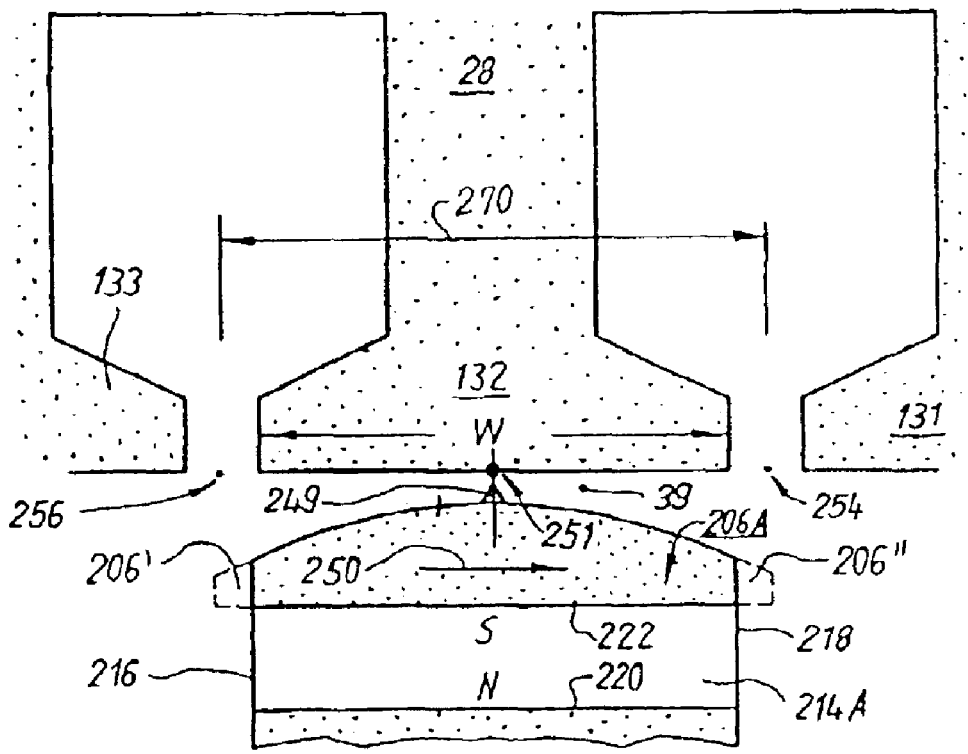
FIGS. 13A & 13B are a schematic drawing, and an associated graph, to explain the cogging or reluctance torque.

FIG. 13A shows, analogous to FIG. 9, in developed form, a tooth or pole 132 of stator lamination stack 28, and a directly opposed pole 206A of rotor 36. The pole shoe of pole 206A has approximately the width W (indicated by arrows) of tooth head 132, and pole 206A will, if no external forces act on it, adjust its magnetic center (symbolized by triangle 249) to the illustrated position 251, since, in this orientation, the energy stored in the magnetic circuit is the smallest. From the symmetry of the drawing, it will be apparent that, in this position 251, no reluctance torque can act upon rotor pole 206A; rather, this is a stable rest position of rotor 36.

Figure 13B:
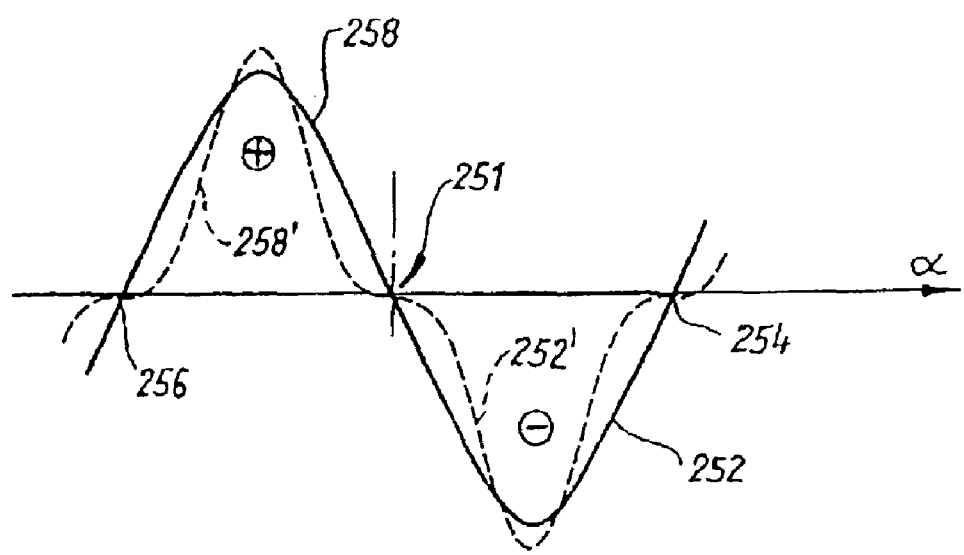

If one rotates, e.g. by hand, the rotor pole 206A in a rotational direction indicated by arrow 250, one must expend energy, i.e. one must overcome a braking torque 252 illustrated in FIG. 13B. This braking torque arises from the fact that energy is being put into the magnetic circuit of the motor and stored.

When the center 249 of rotor pole 206A is opposite a position 254 in the middle of the slot opening between teeth 132 and 131, again no reluctance torque is exerted on rotor pole 206A, i.e. there the reluctance torque 252 has the instantaneous value zero, while between positions 251 and 254, the reluctance torque has traversed a negative maximum.

If the rotor pole 206A is coming from the left of FIG. 13a, i.e., from a position 256 in the middle of the slot opening between teeth 133 and 132, toward position 251, the stator tooth 132 attracts it, so that in this region a driving reluctance torque 258 arises which, between rotational positions 256 and 251, reaches its maximum.

According to the configuration illustrated, there arise, in the region of rotational positions 256, 251, 254, strong changes of the reluctance torque as described, from minus to plus, or from plus to minus, which cause the aforementioned cogging torque.

Due to the supplemental iron volumes at points 228 etc. (FIG. 11), one creates, seen magnetically, a widening of the ferromagnetically active outer parts (FIG. 12: pole shoe 206PS) of the rotor poles 206A, 206B, etc. or, in other words, the pole shoes of these rotor poles become wider, as shown by the dashed-line extensions 206' and 206" of FIG. 13A. This results in a changed reluctance torque 252', 258' as shown by dashed lines in FIG. 13B and which, in the vicinity of rotational positions 256, 251, 254 has a substantially less steep shape.

FIGS. 14A & 14B show, in developed form, all four rotor poles 206A through 206D, as well as the slots and teeth 131–136 of stator lamination stack 28.

When rotor pole 206A exactly opposes tooth 132, the adjacent rotor pole 206B is exactly opposite the slot opening between teeth 131 and 136 because the ratio of six stator slots to the number (4) of rotor poles is 1.5, and thus is not an integer. Preferably, this ratio is an integer multiple of 0.5.

A rotation in direction 150 has, at pole 206A, the already described torque 252, 258 as a result, while at pole 206B, there results a counter-phased torque 268 which substantially cancels out the torque 252, 258. Note that the time-points t0, t1, t2 on the four reluctance torque curves are the same instants, so the superimposed curves cancel.

By means of the widenings 206', 206" (FIGS. 12–13) of the pole shoe 206PS, one can thus create substantially identical but counter-phased curves of reluctance torques which add together to achieve a cogging torque which is approximately zero. One may surmise that the effective width of the pole shoe 206PS, i.e. including the sidewise extensions 206', 206", ought to correspond substantially to the slot pitch 270 shown in FIG. 13A. The precise dimensions of the extensions which provide the greatest reduction in cogging torque can be determined by computer simulation, using programs known in the art, and the structure of the present invention facilitates fast optimization of these dimensional parameters.

Figure 15:
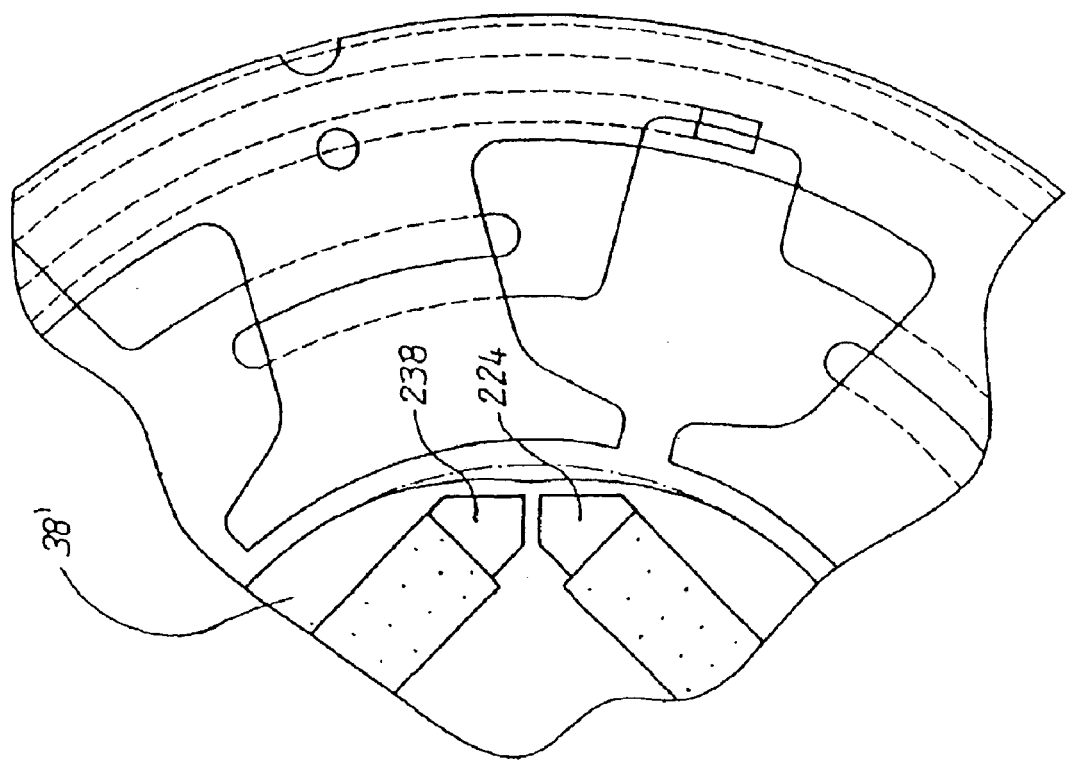
FIG. 15 is an enlarged detail of a motor with a rotor.

FIG. 15 is an enlarged view of a motor having a rotor 38' in which there are no supplemental iron volumes at the radially outer positions (228 in FIG. 11) of the magnetically nonconducting regions (MNR) 224, 238.

Figure 16:
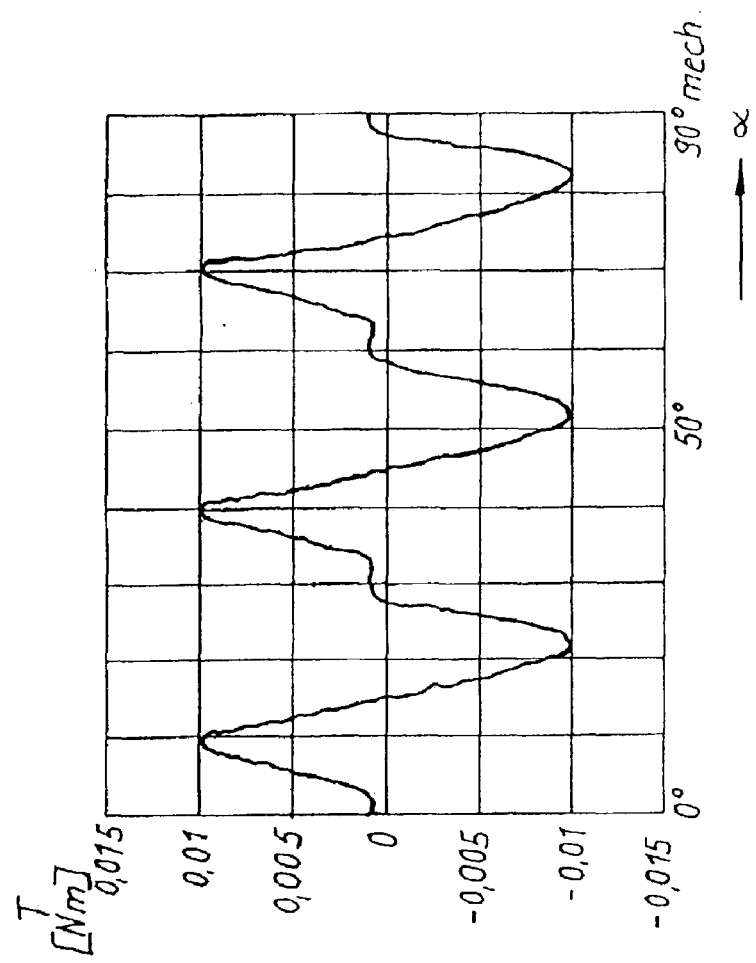
FIG. 16 is a graph of the calculated values of the reluctance torque of the rotor of FIG. 15.

FIG. 16 is a graph showing the calculated values of reluctance torque T (in units of Newton-meters or Nm) over the rotation angle alpha from 0° mech. to 90° mech. for the motor of FIG. 15. The calculation was made using the so-called "finite elements" method. The reluctance torque takes on values in the range between about −0.01 Nm to +0.01 Nm and, in the angular range shown, there are three maxima and three minima of the reluctance torque curve.

Figure 17:
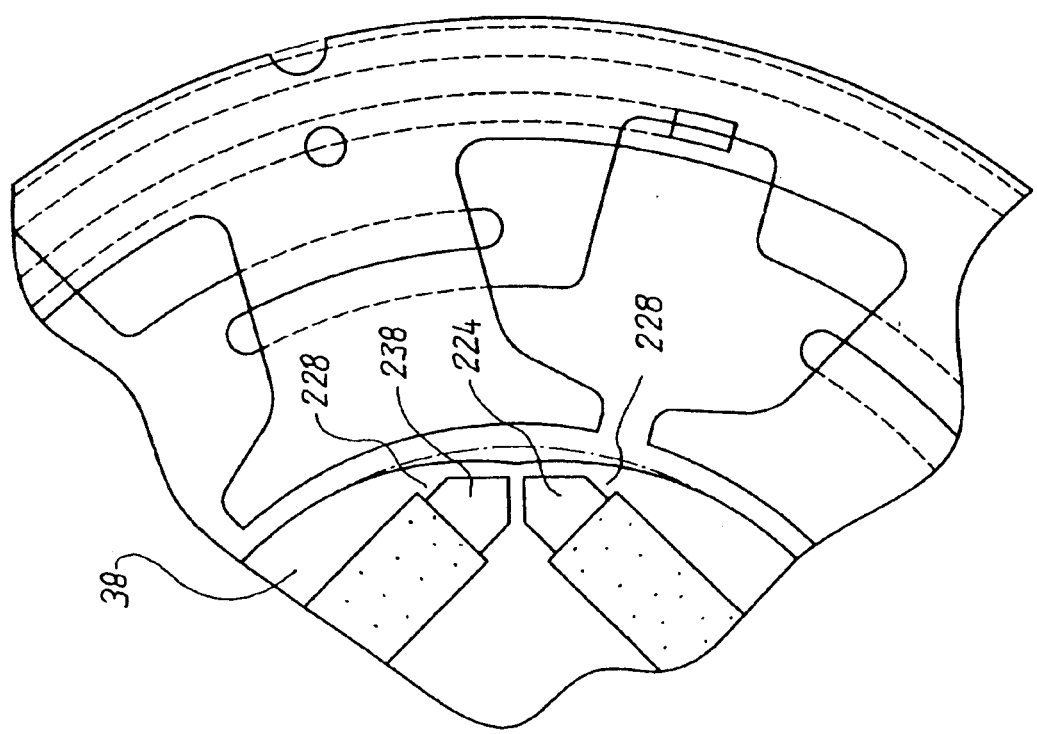
FIG. 17 is an enlarged detail of a motor with a rotor showing an embodiment of the present invention.

In contrast to FIG. 15, FIG. 17 is an enlarged view of a motor having a rotor 38, according to the teaching of the present invention, which does have supplemental iron volumes at the radially outer positions of the magnetically nonconducting regions (MNR) 224, 238 (compare FIG. 11).

Figure 18:
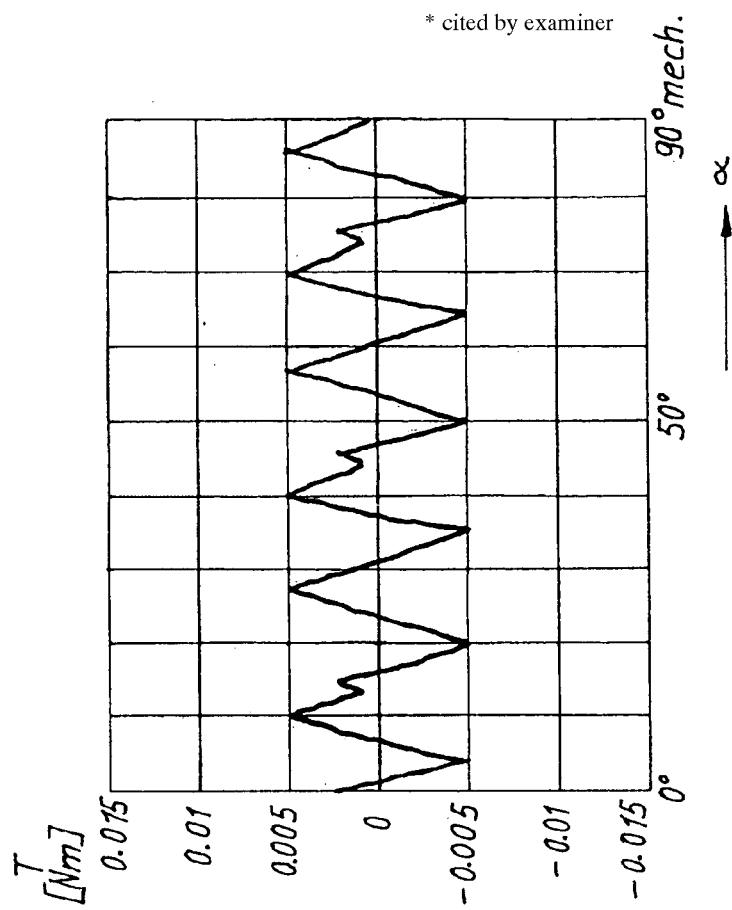
FIG. 18 is a graph of the calculated values of the reluctance torque of the rotor of FIG. 17.

FIG. 18 is a graph showing the calculated improved values of the reluctance torque curve, over the angle alpha for the rotor 38 of FIG. 17. The curve has smaller peaks and valleys and more of them. The reluctance curve takes on values in the range from about −0.005 Nm to about +0.005 Nm and, in the angular range shown, there are six maxima and six minima.

This reduction of the maximum reluctance torque by 40% and the simultaneous increase of the "reluctance torque frequency" has the effect that the reluctance torque has fewer effects on motor performance. In situations of direct transmission of reluctance torque to the user of the motor, this leads to a significant reduction of the disruptive sensory influences or disturbances.

Naturally, many variations and modifications are possible within the scope of the present invention. For example, to the extent that the rotor pole shoes can be mechanically secured in other ways, they could take the form shown in FIG. 12, omitting the lands 234, 240. However, due to its great simplicity and its excellent mechanical characteristics, the solution illustrated is the preferred embodiment.

What is claimed is:

1. A multi-phase internal rotor motor, comprising:
   a slotted stator;
   a rotor separated by an air gap from said stator, said rotor comprising a lamination stack with a plurality of salient poles defining between them interpolar gaps;
   said stack being formed with a plurality of pockets, each extending partway between two adjacent interpolar gaps of said rotor;
   at least one respective essentially parallel-magnetized permanent magnet partially filling each of said pockets and having respective ends facing adjacent ones of said interpolar gaps, said magnet ends, and sidewalls of unfilled portions of said pockets, together defining a region of increased magnetic resistance adjacent each of said magnet ends;

a plurality of thin lands, formed of the rotor laminations, extending essentially in a peripheral direction and essentially parallel to said air gap, said lands having widened cross-sections (206', 206") in a transition region adjacent said magnet ends, so as to cause an effective magnetic widening of said salient poles.

2. The motor according to claim 1, wherein said widened cross-sections of said lands each define a respective shoulder (216B) arranged adjacent to an associated end (216) of a permanent magnet.

3. The motor according to claim 1, wherein said widened cross-sections (206', 206"), of said lands (234) of a rotor pole, extend to a width corresponding substantially to a slot pitch (270) of stator slots of said motor.

4. The motor according to claim 1, wherein said widened cross-sections of said lands are dimensioned such that a sum of reluctance torques generated, during operation, by individual rotor poles is substantially zero.

5. The motor according to claim 1, wherein said lands have a cross-section tapering down toward said interpolar gaps.

6. The motor according to claim 1, wherein said lands have a cross-sectional shape chosen sufficiently small in at least a portion thereof so that, during operation, said portion of said land goes into magnetic saturation.

7. The motor according to claim 1, wherein said salient poles are shaped to obtain, in the air gap, a substantially sinusoidal distribution of magnetic flux.

8. The motor according to claim 7, further comprising means for sensing a rotational position of said rotor and means, responsive to said sensed rotational position, for applying, to windings of said stator, sinusoidal currents, in order to obtain a substantially constant electromagnetic torque during motor operation.

9. The motor according to claim 8, wherein said means for sensing rotational position comprise a control magnet on said rotor, and at least one sensor for detecting a magnetic orientation of said control magnet as it rotates with the rotor.

10. The motor according to claim 1, wherein the ratio of the number of stator slots to the number of rotor poles is not an integer.

11. The motor according to claim 10, wherein the ratio of the number of stator slots to the number of rotor poles is an integer multiple of 0.5.

12. The motor according to claim 11, wherein the ratio of the number of stator slots to the number of rotor poles is 1.5.

13. The motor according to claim 1, wherein the rotor poles and stator slots are not skewed.

14. The motor according to claim 1, further comprising an endplate, mounted on an axial end face of the rotor lamination stack, which closes off, at said end face, the pockets which receive the permanent rotor magnets.

15. The motor according to claim 14, wherein said endplate comprises a non-ferromagnetic metal.

16. The motor according to claim 15, wherein said endplate consists essentially of a stainless steel.

17. The motor according to claim 14, wherein said endplate is secured to an adjacent ferromagnetic sheet of the rotor lamination stack by punch-packetization.

18. A multi-phase internal rotor motor, comprising:

a slotted stator;

a rotor separated by an air gap from said stator, said rotor comprising a lamination stack with a plurality of salient poles defining interpolar gaps therebetween, turning of said rotor past slots of said stator tending to generate reluctance torques;

said stack being formed with a plurality of pockets, each pocket extending partway between two adjacent interpolar gaps of said rotor;

at least one respective essentially radially magnetized permanent magnet partially filling each of said pockets and having respective ends facing adjacent ones of said interpolar gaps, said magnet ends, and sidewalls of unfilled portions of said pockets, together defining a region of increased magnetic resistance adjacent each of said magnet ends;

a plurality of thin lands, formed of the rotor laminations, extending essentially in a peripheral direction and essentially parallel to said air gap, said lands having widened cross-sections (206', 206") in a transition region adjacent said magnet ends, so as to cause an effective magnetic widening of said salient poles;

the ratio of the number of stator slots to the number of rotor poles being n * 0.5 wherein n=1, 3, 5, . . . etc.;

and wherein the reluctance torques generated in operation by the interaction of the rotor poles and the stator slots substantially cancel out.

19. The motor according to claim 18, wherein said lands have a cross-sectional shape chosen sufficiently small in at least a portion thereof so that, during operation, said portion of said land goes into magnetic saturation.

20. The motor according to claim 18, wherein said salient poles are shaped to obtain, in the air gap, a substantially sinusoidal distribution of magnetic flux.

21. The motor according to claim 18, wherein the ratio of the number of stator slots to the number of rotor poles is 1.5.

22. The motor according to claim 18, wherein the rotor poles and stator slots are not skewed.

* * * * *